US008886920B2

(12) United States Patent
Olson et al.

(10) Patent No.: US 8,886,920 B2
(45) Date of Patent: Nov. 11, 2014

(54) ASSOCIATING TAG TO BRANCH INSTRUCTION TO ACCESS ARRAY STORING PREDICTED TARGET ADDRESSES FOR PAGE CROSSING TARGETS FOR COMPARISON WITH RESOLVED ADDRESS AT EXECUTION STAGE

(75) Inventors: Christopher H. Olson, Austin, TX (US); Manish K. Shah, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 481 days.

(21) Appl. No.: 13/228,347

(22) Filed: Sep. 8, 2011

(65) Prior Publication Data

US 2012/0290817 A1  Nov. 15, 2012

Related U.S. Application Data

(60) Provisional application No. 61/485,905, filed on May 13, 2011.

(51) Int. Cl.
*G06F 9/38* (2006.01)

(52) U.S. Cl.
CPC ............ *G06F 9/3851* (2013.01); *G06F 9/3808* (2013.01); *G06F 9/3806* (2013.01); *G06F 9/3844* (2013.01)
USPC ...... 712/237; 712/238; 712/239; 712/E9.051; 712/E9.06

(58) Field of Classification Search
None
See application file for complete search history.

(56) References Cited

U.S. PATENT DOCUMENTS

| | | | |
|---|---|---|---|
| 5,265,213 A * | 11/1993 | Weiser et al. ................. | 712/240 |
| 5,442,756 A * | 8/1995 | Grochowski et al. ......... | 712/238 |
| 5,586,278 A | 12/1996 | Papworth et al. | |
| 6,678,815 B1 * | 1/2004 | Mathews et al. .............. | 711/205 |
| 6,721,876 B1 * | 4/2004 | Chen et al. .................... | 712/239 |
| 7,152,155 B2 | 12/2006 | McIlvaine et al. | |
| 7,266,676 B2 * | 9/2007 | Tran et al. ..................... | 712/238 |
| 7,363,477 B2 | 4/2008 | Srinivasan et al. | |
| 7,523,296 B2 | 4/2009 | Wang et al. | |
| 7,624,254 B2 | 11/2009 | Smith et al. | |
| 7,711,934 B2 | 5/2010 | Kishore et al. | |
| 8,281,110 B2 * | 10/2012 | McDonald et al. ........... | 712/219 |

(Continued)

OTHER PUBLICATIONS

Guan-Ying Chiu, Hui-Chin Yang, Li, W.Y.-H., Chung-Ping Chung, "Mechanism for return stack and branch history corrections under misprediction in deep pipeline design," 13th Asia-Pacific Computer Systems Architecture Conference, 2008, 8 pages.

(Continued)

*Primary Examiner* — Kenneth Kim
(74) *Attorney, Agent, or Firm* — Meyertons, Hood, Kivlin, Kowert & Goetzel, P.C.

(57) ABSTRACT

A processor configured to facilitate transfer and storage of predicted targets for control transfer instructions (CTIs). In certain embodiments, the processor may be multithreaded and support storage of predicted targets for multiple threads. In some embodiments, a CTI branch target may be stored by one element of a processor and a tag may indicate the location of the stored target. The tag may be associated with the CTI rather than associating the complete target address with the CTI. When the CTI reaches an execution stage of the processor, the tag may be used to retrieve the predicted target address. In some embodiments using a tag to retrieve a predicted target, CTI instructions from different processor threads may be interleaved without affecting retrieval of predicted targets.

15 Claims, 7 Drawing Sheets

(56) References Cited

U.S. PATENT DOCUMENTS

| | | | |
|---|---|---|---|
| 8,667,258 B2* | 3/2014 | Prasky et al. ............... | 712/238 |
| 2004/0215720 A1 | 10/2004 | Alexander et al. | |
| 2005/0015577 A1 | 1/2005 | Kruckemyer | |
| 2006/0282829 A1 | 12/2006 | McIlvaine et al. | |

OTHER PUBLICATIONS

Ching-Long Su, Despain, A.M., "Branch with masked squashing in superpipelined processors," Proceedings of the 21st Annual International Symposium on Computer Architecture, 1994, pp. 130-140.

Ching-Long Su, Despain, A.M., "Minimizing branch misprediction penalties for superpipelined processors," Proceedings of the 27th Annual International Symposium on Microarchitecture, 1994, pp. 138-142.

Gummaraju, J., Franklin, M., "Branch prediction in multi-threaded processors," Proceedings at the International Conference on Parallel Architectures and Compilation Techniques, 2000, pp. 179-188.

Sendag, R., Yi, J.J., Peng-fei Chuang, "Branch Misprediction Prediction: Complementary Branch Predictors," IEEE Computer Architecture Letters, vol. 6, No. 2, Jul.-Dec. 2007, pp. 49-52.

International Search Report and Written Opinion in Application No. PCT/US2012/037807, mailed Sep. 14, 2012, pp. 1-11.

* cited by examiner

US 8,886,920 B2

ASSOCIATING TAG TO BRANCH INSTRUCTION TO ACCESS ARRAY STORING PREDICTED TARGET ADDRESSES FOR PAGE CROSSING TARGETS FOR COMPARISON WITH RESOLVED ADDRESS AT EXECUTION STAGE

This application claims the benefit of U.S. Provisional Application No. 61/485,905, filed on May 13, 2011, which is incorporated by reference herein in its entirety.

BACKGROUND

1. Technical Field

This disclosure relates to processors, and more specifically to storing and retrieving branch target addresses in multi-threaded processors.

2. Description of the Related Art

Modern superscalar microprocessors achieve high performance by executing multiple instructions in parallel and out of program order. Control transfer instructions (CTIs) such as branches, calls, and returns, which are highly prevalent in programs, can cause pipelined microprocessors to stall because the instructions to be executed after a given control transfer instruction are not known until the control transfer instruction is executed. These stalls can result in significant loss of performance.

Modern microprocessors employ branch prediction techniques to speculatively fetch and execute instructions beyond CTIs. Branch prediction involves predicting the direction and the target of the CTI. If the CTI is mispredicted either due to the direction prediction or the target prediction being incorrect, then all instructions speculatively fetched beyond the CTI are thrown away (flushed), and new instructions are fetched by the Instruction Fetch Unit (IFU) from the correct path. Also, upon detection of a mispredicted CTI, the branch predictor is typically updated using the actual results of the CTI to enhance its future prediction accuracy.

Modern microprocessors commonly implement chip level multi-threading (CMT) to improve performance. In CMT processors, multiple software threads are concurrently active in the processor, and each active thread has dedicated hardware resources to store its state. Efficient execution of instructions from multiple software threads may involve an ability to predict CTIs from different threads. Execution of multiple threads on CMT processors may cause execution of CTIs from different threads to be interleaved.

SUMMARY

This disclosure relates to a processor configured to execute control transfer instructions (CTIs). In some embodiments, a mechanism is disclosed that facilitates efficient transfer and storage of predicted targets for control transfer instructions executed by a processor. In certain embodiments, the processor may be multithreaded and the mechanism may support storage of predicted targets for multiple threads.

In some embodiments, a predicted CTI target address may be stored by an element of a processor and a tag may indicate the location of the stored target address. The tag may be associated with the CTI, instead of associating the complete target address with the CTI. When the CTI reaches an execution stage, the tag may be used to retrieve the predicted target address. In some embodiments, CTI instructions from different processor threads may be interleaved and different threads may share the same storage element.

In one exemplary embodiment, a branch target array (BTA) is used to store predicted target addresses for CTIs. After a CTI is fetched, a branch prediction unit predicts a target address and a direction for a CTI. The predicted target address is stored in the BTA, and a tag corresponding to the location of the target address in the BTA is associated with the CTI. The tag is passed through stages of an execution pipeline along with the CTI. When the CTI and tag reach a branch execution unit, the branch execution unit retrieves the predicted target address from the BTA using the tag. The branch execution unit also computes an actual target address for the CTI, and compares the actual target address to the predicted address to resolve the branch target. In some embodiments, the BTA and tag may be efficient storage and transfer mechanisms for predicted targets. In other embodiments, other elements may perform one or more of the functionalities of the exemplary embodiment described above.

DETAILED DESCRIPTION

Figure 1:
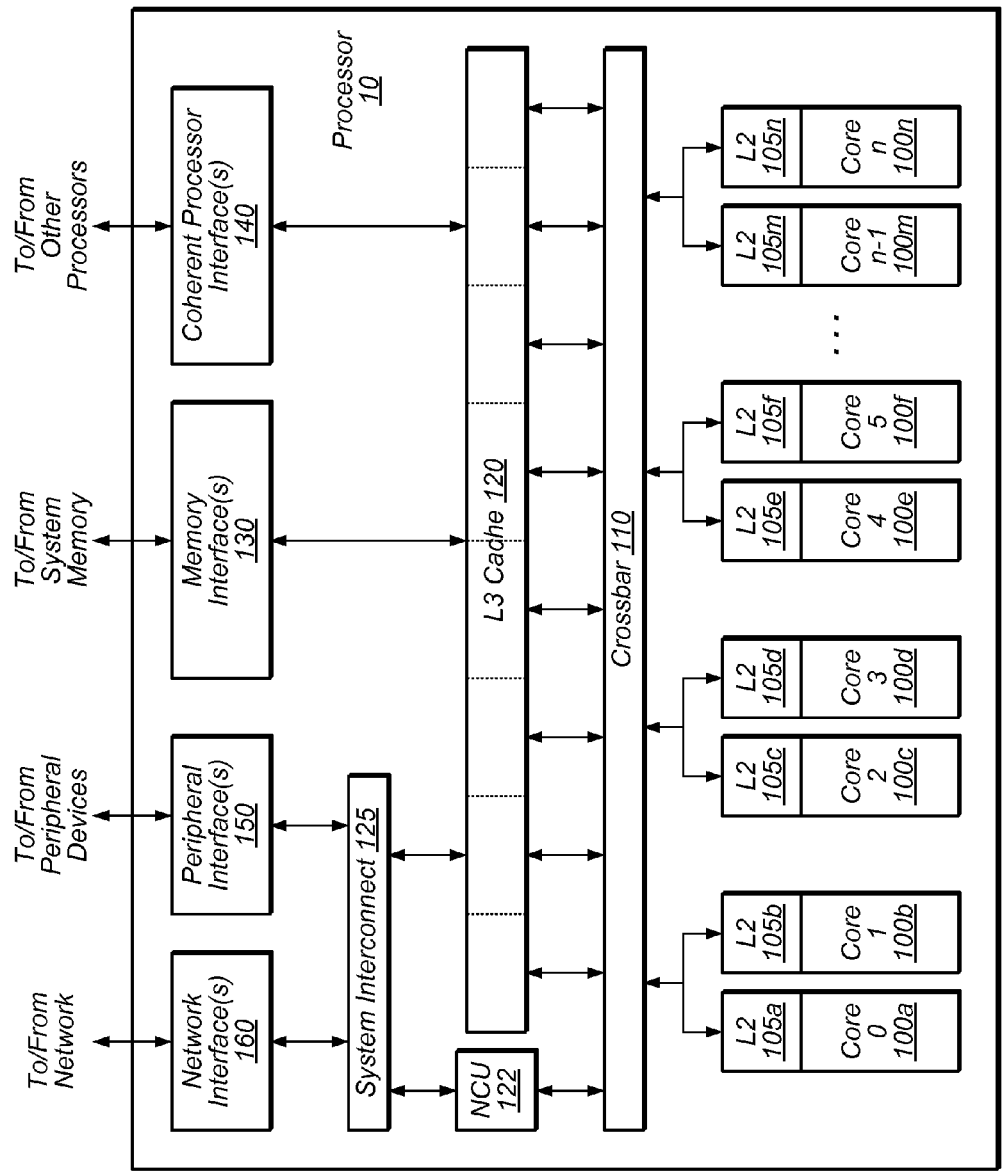
FIG. 1 is a block diagram of one embodiment of a multi-core processor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims): "Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Execute." This term has its ordinary and accepted meaning in the art, and includes all actions that may be performed by a processor to effectuate the completion of the instruction, including fetch, decode, issue, as well as actually computing the result of the instruction. When a functional unit is described herein as "executing" a particular instruction, this term refers to computing a result of the particular instruction (e.g., computing the sum of the contents of two registers). Similarly, when an instruction is described herein as reaching an "execution stage" of a processor pipeline, this term refers to the instruction reaching a functional unit for computing a result of the particular instruction.

"Thread." This term has its ordinary and accepted meaning in the art, and includes a set of instructions within a program that is executable by a processor. The term "thread" may, for example, refer to a group of instructions executing on a processor as a result of a "fork" or other similar operation. Instructions described herein as being "in" a thread are a part of the set of instructions for a thread.

"Concurrently Storing/Simultaneously Storing." As used herein, these phrases refer to storing items (e.g., branch target information for different threads) for some overlapping period. Note that these phrases do not necessary imply that the storage of two concurrently stored items begins at the same time or that the two items are stored for the same length of time.

Introduction

Figure 2:
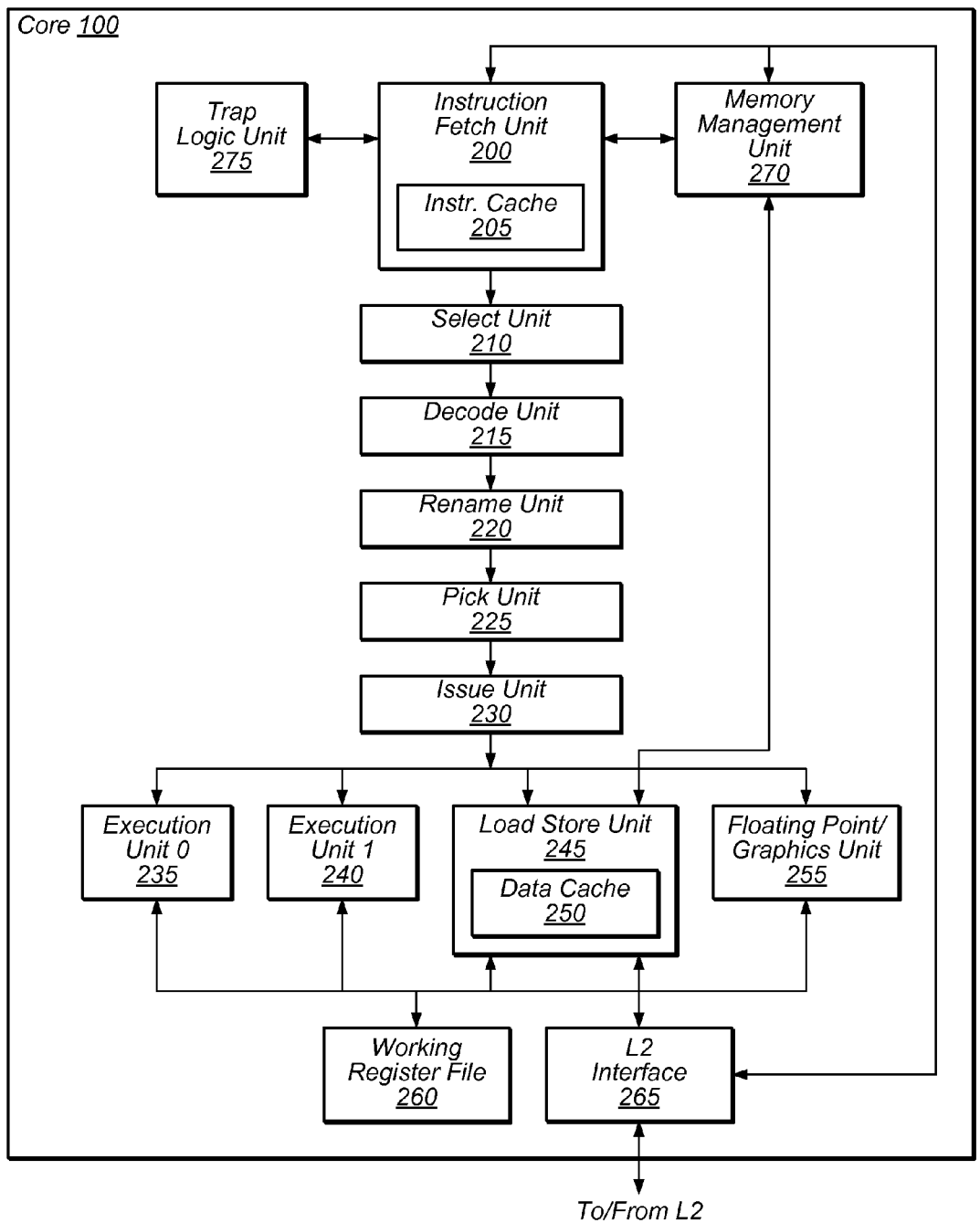
FIG. 2 is a block diagram of one embodiment of a processor core.
Figure 3:
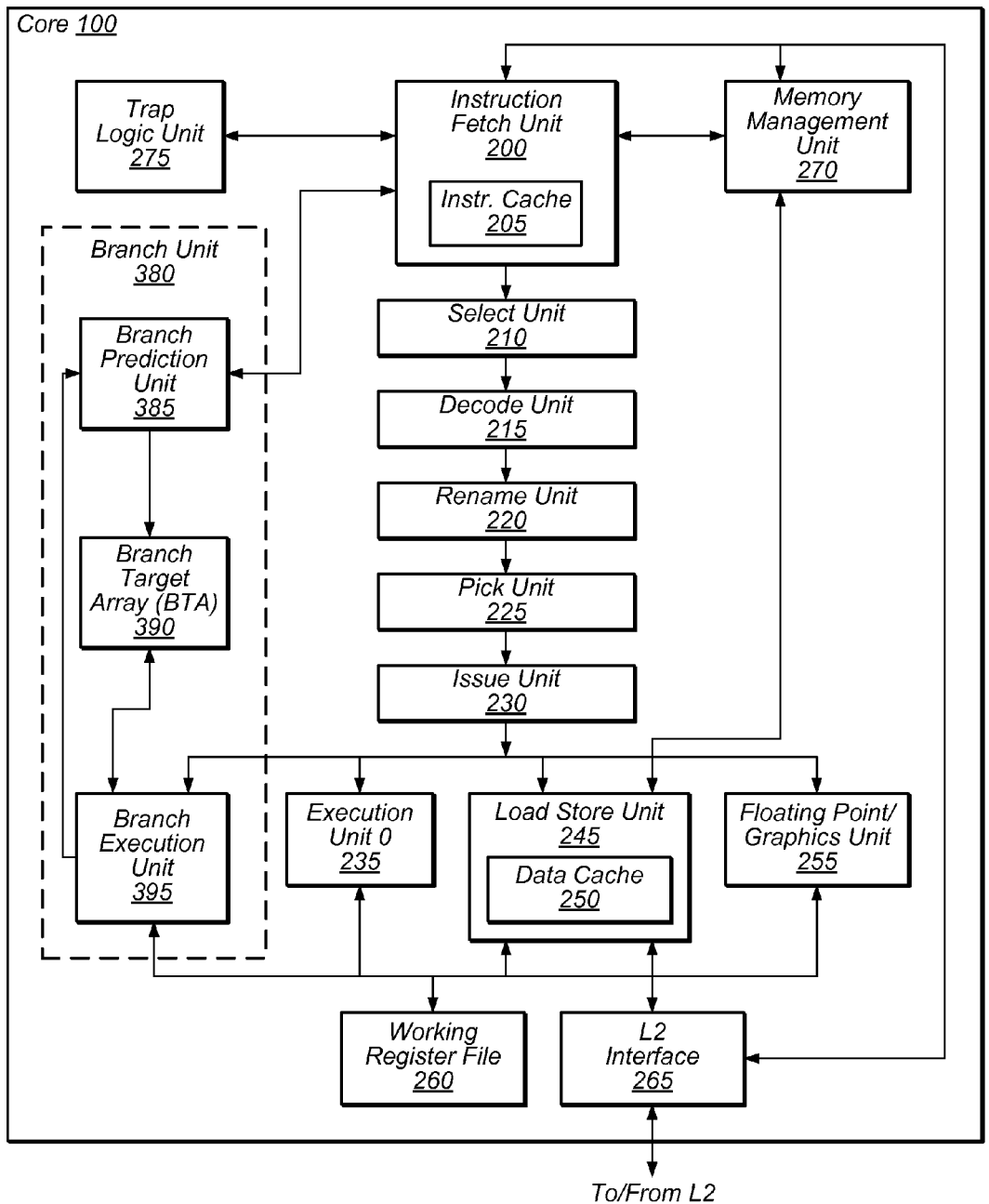
FIG. 3 is a block diagram of a more specific embodiment of a processor core, including a branch unit.
Figure 4:
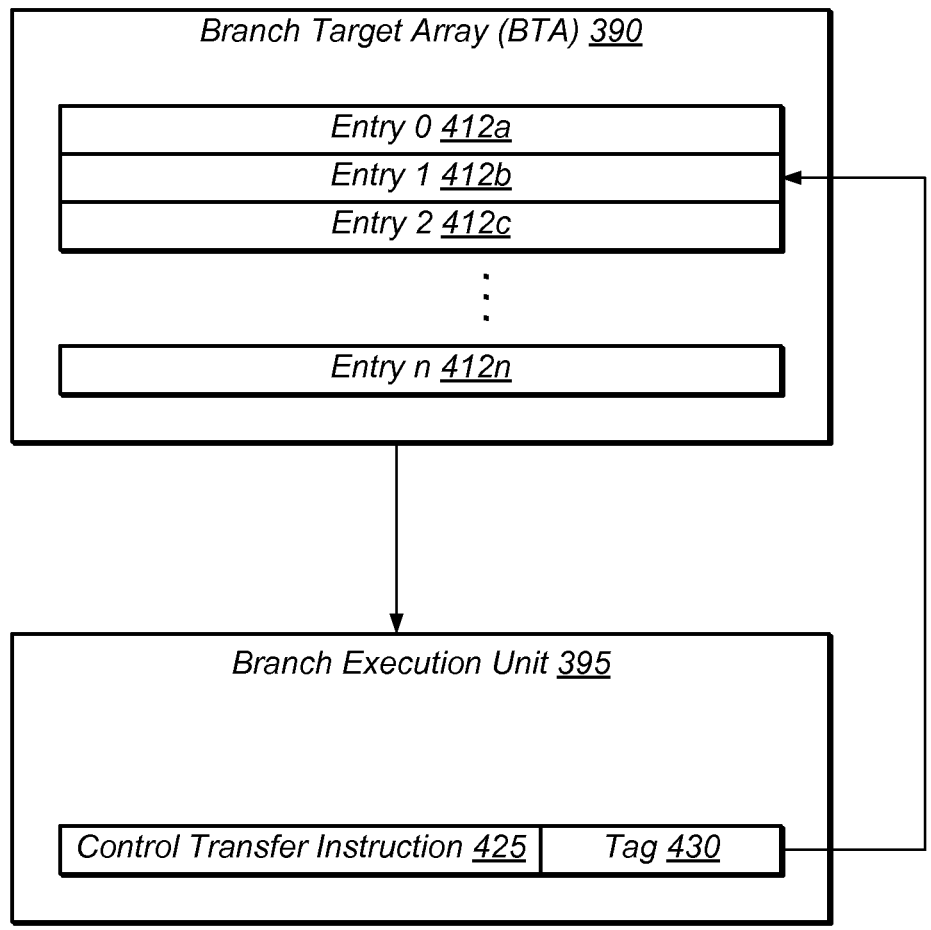
FIG. 4 is a block diagram of one embodiment of a branch target array and branch execution unit.
Figure 5:
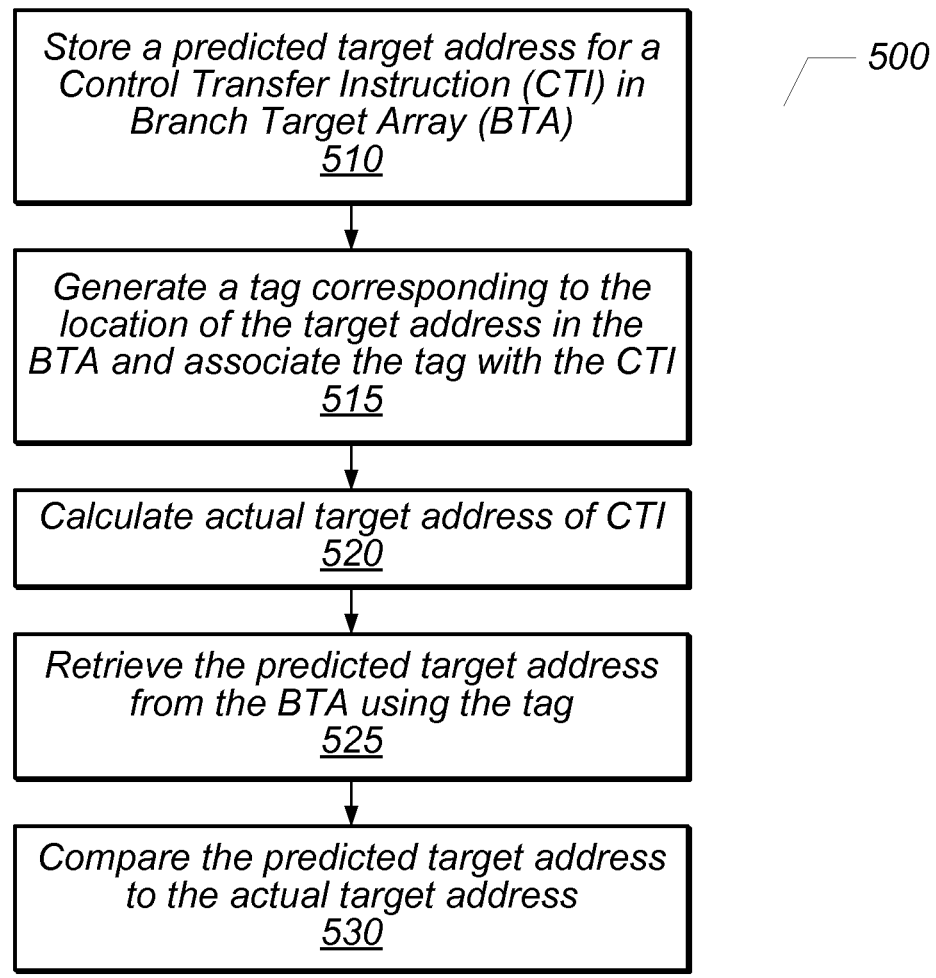
FIG. 5 is a flow diagram illustrating one embodiment of using a branch target array to store CTI predicted targets.
Figure 6:
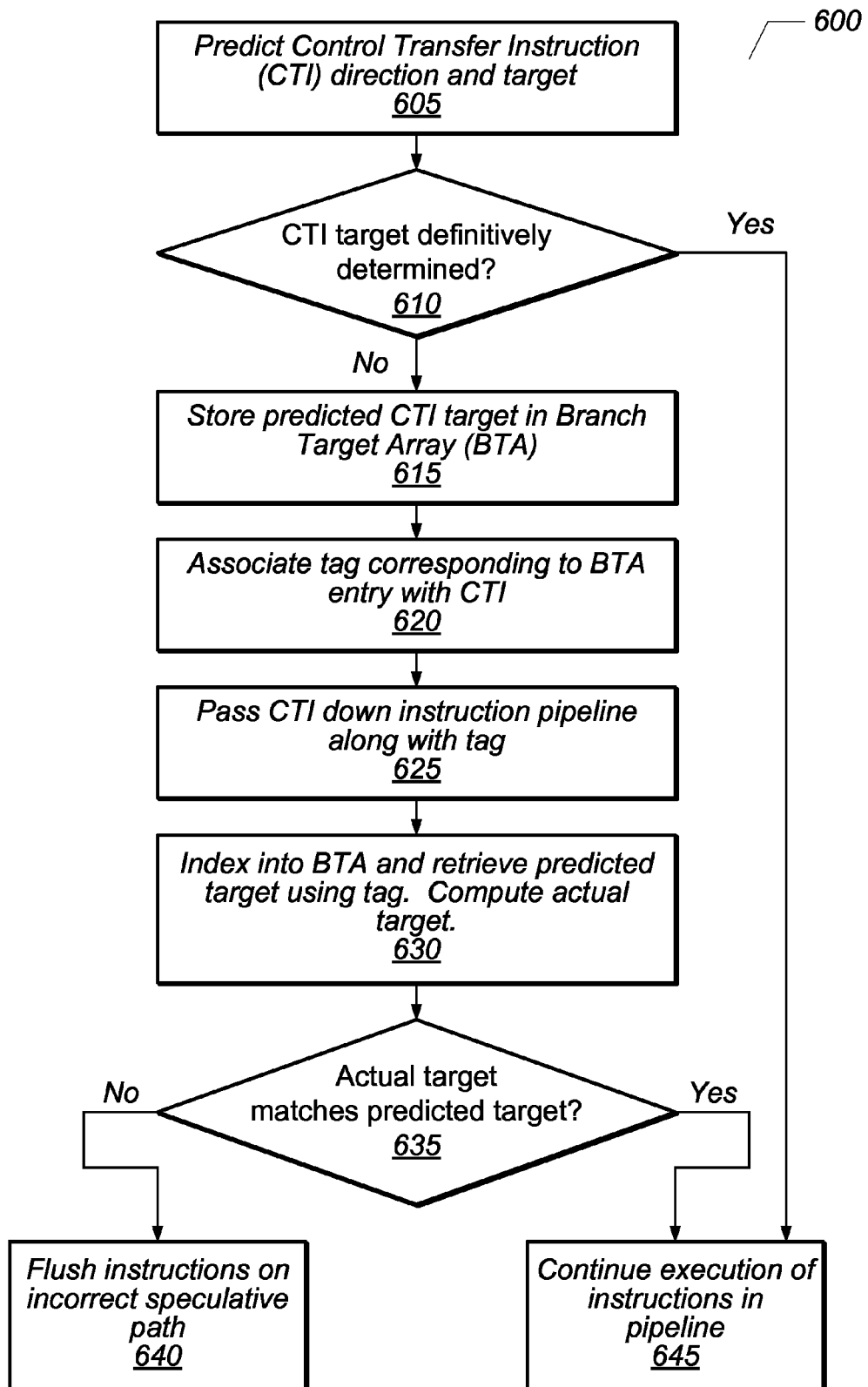
FIG. 6 is a flow diagram illustrating a more specific embodiment of using a branch target array to store CTI predicted targets.
Figure 7:
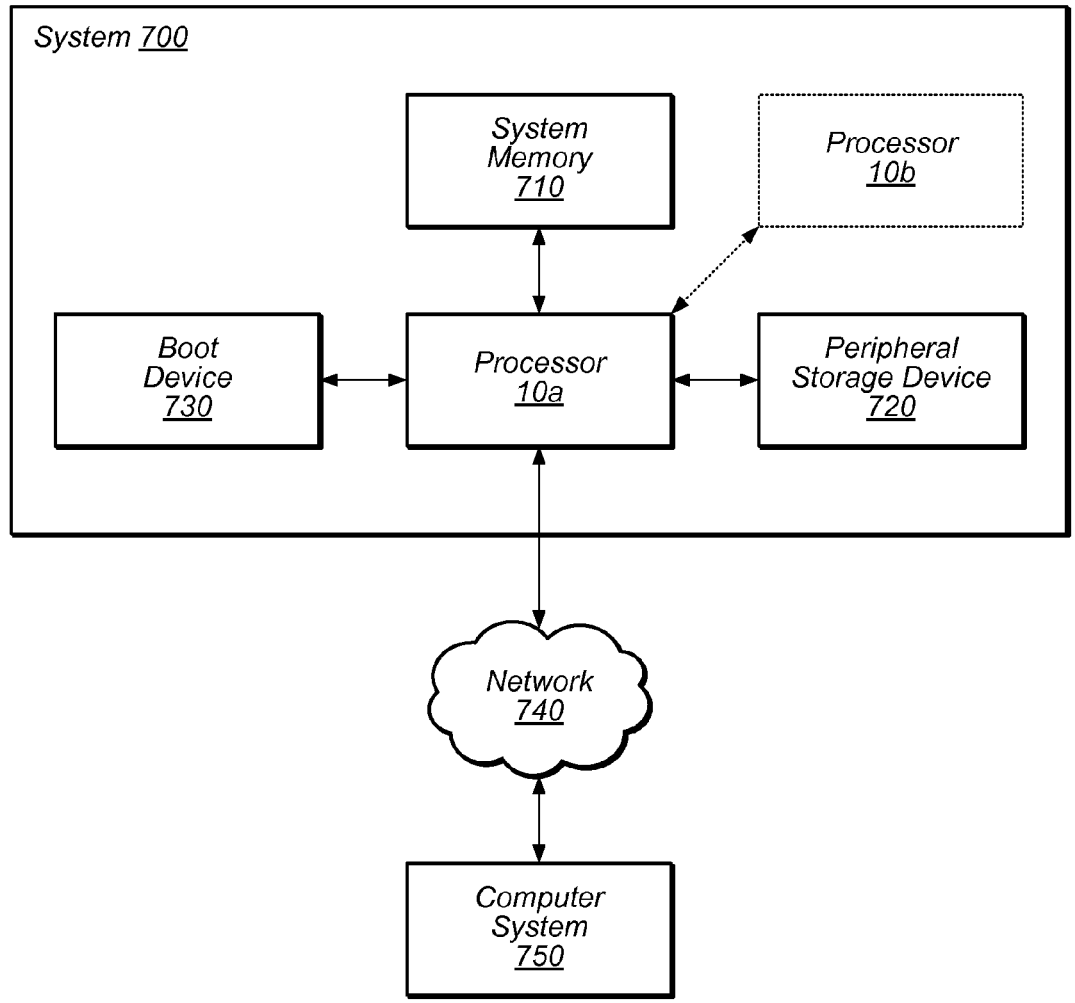
FIG. 7 is a block diagram illustrating an exemplary system embodiment.

The present disclosure describes various embodiments relating to circuitry that facilitates processing of control transfer instructions. FIGS. 1 and 2 present an overview of an exemplary multithreaded processor in which such circuitry may be included. FIGS. 3 and 4 present exemplary embodiments of processor elements for branch target storage. FIGS. 5 and 6 present exemplary methods for branch target storage. FIG. 7 presents an overview of a computer system in which such a processor may be used.

Processor Overview

Turning now to FIG. 1, a block diagram illustrating one embodiment of a processor 10 is shown. In certain embodiments, processor 10 may be multithreaded. In the illustrated embodiment, processor 10 includes a number of processor cores 100a-n, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of the L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution.

Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions.

In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments, execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Branch Target Array

In various embodiments, processor 10 or processor core 100 may include an instruction fetch unit or a branch prediction unit to predict targets for CTIs. In some situations, it may be possible for the instruction fetch unit or branch prediction unit to definitively determine the actual target before execution of the CTI, such as when the target does not cross a page boundary (e.g., an 8K boundary). In other situations, however, the predicted target may be incorrect and the actual target may need to be checked against the predicted target at the execute stage. In some embodiments, a branch target array is provided for storage of predicted CTI target addresses during the time period between prediction of CTI targets and execution of CTIs.

Turning now to FIG. 3, an embodiment of core 100 that includes a branch unit 380 is shown. Branch unit 380 may be partially located within the instruction fetch unit (IFU) 200. For example, branch prediction unit 385 may be located within the IFU 200, or coupled to the IFU 200 as shown in FIG. 3. In other embodiments, branch unit 380 may be located elsewhere in core 100. FIG. 3 is exemplary of one embodiment and not meant to limit the location or connectivity of branch unit 380. In the illustrated embodiment, branch unit 380 includes: a branch prediction unit 385, a branch target array 390, and a branch execution unit 395. In other embodiments, branch unit 380 may include further elements and/or storage. In some embodiments, processor 10 is configured CTIs in-order with respect to other CTIs from the same thread, but is configured to execute CTIs across threads in any order regardless of which was fetched first.

In one embodiment, branch execution unit 395 determines the actual direction and target of the oldest CTI in a given thread, and then compares the actual direction and target of the CTI with the predicted direction and target to determine if the CTI was mispredicted. If a misprediction is detected, then all younger instructions on the incorrect speculative path behind the CTI are flushed, the instruction fetch unit is redirected to fetch instructions from the corrected target address, and the branch prediction unit 385 is updated based on the actual direction and target of the CTI. Note that in some embodiments a predicted target may be equivalent to a predicted target address, and the terms may be used interchangeably in this disclosure.

As noted above, at execute time, CTI redirection can occur in some implementations, either because the predicted direction was incorrect or because the predicted target was incorrect. With respect to the second of these issues, the branch execution needs access to the predicted target in order to make a comparison to the actual target. (As noted above, CTIs may be executed in a different order than that in which they are predicted.) Simply attaching, for example, a 50-bit target address to any instruction flowing down the pipeline is prohibitively expensive. Another approach would be to add a threaded structure, where each thread has its own dedicated entries. As the number of threads grows (e.g., a processor that supports up to eight threads), the structure would grow too large if it held a reasonable number of entries per thread, or it would have so few entries that a thread might starve when its entries were full.

In some embodiments, a branch target array (BTA) 390 may be used to facilitate access by a branch execution unit to predicted targets of CTIs. BTA 390 may be located within branch unit 380 or elsewhere in core 100. In some embodiments, BTA 390 may have 2 to 128 entries to facilitate access to entries in BTA 390, for reasons described below. In one particular embodiment, the BTA has 32 entries. As noted previously, in some implementations of processor 10, only certain CTIs may have uncertainty as to whether the predicted target is correct (e.g., those instructions whose target crosses an 8K page boundary), while other CTIs may have targets that can be definitively determined. Said another way, CTI targets that are definitively determined are known to be correct when predicted by a branch predictor and instruction fetch unit, before reaching an execution stage of a processor. In other embodiments, predicted targets may or may not be definitively determined for various reasons. In some embodiments, BTA entries are allocated only to those CTIs having "predicted" targets (i.e., targets that cannot be definitively determined at prediction time). In some instances, all CTIs may have predicted targets.

In some embodiments, the BTA entries may be dynamically allocated to any of multiple threads executing on processor 10. In one embodiment, the branch prediction unit 385 allocates an entry into the BTA 390 when it predicts a CTI (i.e., encounters a CTI whose target cannot be definitively determined, such as when there is a prediction for a CTI target that crosses an 8K page boundary). In other embodiments, BTA entries may be allocated for any CTI instructions. When an entry is allocated, a tag may be used to identify the entry (e.g., a 5-bit tag may be used to identify an entry in a 32-entry BTA). BTAs with numbers of entries ranging from 2 to 128 require tags ranging from 1 bit to 7 bits to uniquely identify all BTA entries. In some embodiments, BTAs containing a number of entries in the range of 2 to 128 may be used in order to keep the tag size small relative to the size of a stored target address. The tag corresponding to the allocated entry may be passed to the branch execution unit 395 along with the CTI through the processor pipeline. Piping the tag with the instruction automatically handles the out-of-order processing of CTIs between threads, because predicted targets are accessible using the tag regardless of CTI order. At execution time, the branch execution unit 395 may use the tag passed along with the CTI to read the predicted target from the indicated entry in the BTA. The branch execution unit 395 is then configured to compare the predicted target with the actual target. Thus, the BTA may provide a low-cost mechanism to allow the branch execution unit access to the predicted target for a given CTI.

Turning now to FIG. 4, a specific embodiment of BTA 390 is shown. BTA 390 may include a plurality of entries 412a-412n for storing predicted target addresses. Branch execution unit 395 may receive a CTI 425 along with a tag 430 (the tag may have been associated with the CTI by the branch prediction unit 385 or some other processor element). In the illustrated embodiment, the tag is used to index into BTA 390 to retrieve a stored predicted target address corresponding to the CTI. Other methods for using the tag to locate an entry in a BTA are contemplated. BTA 390 may use a bit or other means for each entry to indicate whether entries are available for allocation or in use. When a predicted target address is retrieved from BTA 390, an indicator may be changed to show that the corresponding entry is no longer in use, or other means may be used to indicate an available entry. In some embodiments, BTA entries may be statically allocated amongst active threads. This arrangement allows for quality of service and prevents one thread from "hogging" the BTA, and therefore negatively impacting the performance of other threads.

Turning now to FIG. 5, a flow diagram of method 500 illustrating one embodiment of utilizing a BTA is shown. A predicted target address for a CTI is stored in a BTA (block 510). A tag corresponding to the location of the target address in the BTA is generated, and associated with the CTI (block 515). The actual target address of the CTI is calculated (block 520). The predicted target address is retrieved from the BTA using the tag (block 525). The predicted target address is compared to the actual target address (block 530). Use of method 500 prevents passing the complete predicted target address down a processor pipeline, because only the bits of the tag are passed with the CTI.

Turning now to FIG. 6, a flow diagram of method 600, another embodiment of utilizing a BTA, is shown. A CTI direction and target is predicted (block 605). In various embodiments, this prediction may be performed by an instruction fetch unit and/or a branch prediction unit. As previously discussed, some target predictions may be definitively determined before execution (as opposed to target predictions that cross page boundaries, or are otherwise dependent on unavailable information or uncompleted instructions at prediction time). If the target is definitively determined (as determined in decision block 610), the processor may continue execution of instructions in a processor pipeline, at least until it is determined whether the predicted direction is correct. If the predicted target is not definitively determined, (e.g., a target crossing an 8K page boundary), the predicted target is stored in a BTA (block 615). A tag corresponding to the BTA entry is associated with the CTI (block 620). This association may take different forms in various embodiments. For example, bits of the CTI or pipeline elements may be reserved for the tag. The CTI is then passed down the instruction pipeline as previously described (which may include selection unit 210, decode unit 215, rename unit 220, pick unit 225, and/or issue unit 230). At some point in the pipeline, the predicted target is retrieved from the BTA and the actual target address is computed (block 630). If the actual target matches the retrieved predicted target, the processor may continue to execute instructions in the pipeline (645). If the predicted target and the actual target do not match, the processor may flush all younger instructions on the incorrect speculative path behind the CTI in the pipeline (block 640). Younger instructions correspond to instructions following the CTI in program order (and fetched after the CTI), which may or may not be executed before the CTI in an out-of-order processor.

In one embodiment, the BTA may be unified, allowing its limited resources to be dynamically and concurrently allocated between threads as needed. Thus, when a core is running in single-thread mode, all entries may be made available to that thread. In some architectures, CTIs with predicted targets (e.g., those with targets crossing an 8K page boundary) may be sufficiently rare that a 32-entry BTA is sufficient for most applications running on eight threads. In the rare instances in which a thread has an unusually high number of predicted targets, the ability to dynamically allocate the target array entries between multiple threads may provide better performance if the other threads happen to have fewer predicted targets. In embodiments where multiple threads may have high numbers of predicted targets, the BTA may be dynamically re-sized to contain an appropriate number of entries.

Exemplary System Embodiment

As described above, in some embodiments, processor 10 of FIG. 1 may be configured to interface with a number of external devices. One embodiment of a system 700 including processor 10 is illustrated in FIG. 7. In the illustrated embodiment, system 700 includes an instance of processor 10, shown as processor 10a, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 160.

In various embodiments, system memory 710 may comprise any suitable type of system memory as described above, such as FB-DIMM, DDR/DDR2/DDR3/DDR4 SDRAM, RDRAM®, flash memory, and of various types of ROM, etc. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 720 may be coupled to processor 10 via peripheral interface(s) 150 of FIG. 1.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an instruction fetch unit configured to fetch instructions including a first control transfer instruction (CTI);
a branch prediction unit configured to generate predicted target addresses for CTIs, wherein one or more of the predicted target addresses are definitively determined before performance of the corresponding CTI and wherein one or more of the predicted target addresses cross a page boundary, wherein the branch prediction unit is not configured to definitively determine predicted targets addresses that cross a page boundary before performance of the corresponding CTI; and
a branch target array having a plurality of entries;
wherein the apparatus is configured to:
store a predicted target address for the first CTI in an entry of the branch target array and associate a tag with the first CTI that is usable to access the entry, in response to determining that the predicted target address is not definitively determined prior to performance of the first CTI;
perform the first CTI to determine an actual target address; and
retrieve the predicted target address using the tag and compare the predicted target address with the actual target address to determine whether the predicted target address was correctly predicted;
wherein the apparatus is configured to store predicted target addresses in the branch target array only for CTIs whose predicted target addresses are not definitively determined prior to performance.

2. The apparatus of claim 1, wherein a number of bits of the tag is smaller than a number of bits of the predicted target address.

3. The apparatus of claim 1, wherein the apparatus is configured to flush one or more instructions in a pipeline in response to determining that the predicted target address and the actual target address do not match.

4. The apparatus of claim 1, wherein the apparatus is configured to support out-of-order execution of instructions, and wherein the apparatus is configured to support a plurality of threads.

5. The apparatus of claim 4, wherein the apparatus is configured to allocate any of the plurality of entries to any of the plurality of threads.

6. The apparatus of claim 4, wherein the apparatus is configured to statically allocate at least a portion of the plurality of entries to one or more of the plurality of threads.

7. The apparatus of claim 1, wherein the predicted target address is a virtual address having at least 32 bits and wherein the branch target array has 2 to 128 entries.

8. An apparatus, comprising:
a branch execution unit;
a branch target array; and
a branch prediction unit configured to generate a predicted target address for a control transfer instruction, wherein the branch prediction unit is configured to generate predicted target addresses for control transfer instructions, wherein one or more of the predicted target addresses are definitively determined before performance of a corresponding control transfer instruction and wherein one or more of the predicted target addresses cross a page boundary, wherein the branch prediction unit is not configured to definitively determine predicted targets addresses that cross a page boundary before performance of a corresponding control transfer instruction;
wherein the apparatus is configured to associate a tag with the control transfer instruction and store the predicted target address in the branch target array at a location indicated by the tag in response to determining that the predicted target address crosses a page boundary, wherein the apparatus is not configured to store predicted target addresses that are definitively determined in the branch target array; and wherein the branch execution unit is configured to determine an actual target address for the control transfer instruction, use the tag to retrieve the predicted target address from the branch target array, and compare the predicted target address to the actual target address.

9. The apparatus of claim 8, wherein the apparatus is further configured to flush younger instructions on an incorrect speculative path in response to determining that the actual target address and the predicted target address do not match, wherein the incorrect speculative path was fetched by the apparatus based on the predicted target address, wherein the younger instructions follow the control transfer instruction in program order.

10. The apparatus of claim 8, further comprising an execution pipeline having a plurality of stages, wherein the tag passes through the plurality of stages with the control transfer instruction before reaching the branch execution unit.

11. A method, comprising:

predicting, by a processor, a target address for a control transfer instruction;

determining that the predicted target address is not definitively determined prior to performance of the control transfer instruction because it crosses a page boundary;

in response to the determining, storing the predicted target address in an entry of a branch target array, wherein the branch target array includes a plurality of entries;

refraining from storing predicted target addresses that are definitively determined prior to performance in the branch target array;

the processor associating a tag with the control transfer instruction, wherein the entry is accessible using the tag;

performing the control transfer instruction to determine an actual target address;

the processor retrieving the predicted target address from the entry using the tag; and the processor comparing the predicted target address to the actual target address.

12. The method of claim 11, wherein the branch target array is configured to store predicted target addresses of control transfer instructions from a plurality of processor threads.

13. The method of claim 11, wherein the predicted target address is a virtual address.

14. The method of claim 11, wherein the tag is an index of the entry in the branch target array and the number of bits of the tag is smaller than the number of bits of the predicted target address.

15. The method of claim 11, further comprising flushing one or more instructions in a processor pipeline in response to determining that the actual target address and the predicted target address are not the same.

* * * * *

UNITED STATES PATENT AND TRADEMARK OFFICE
CERTIFICATE OF CORRECTION

PATENT NO. : 8,886,920 B2  Page 1 of 1
APPLICATION NO. : 13/228347
DATED : November 11, 2014
INVENTOR(S) : Olson et al.

It is certified that error appears in the above-identified patent and that said Letters Patent is hereby corrected as shown below:

In the Specification

In column 12, line 42, delete "checking" and insert -- checking. --, therefor.

Signed and Sealed this
Twenty-third Day of June, 2015

Michelle K. Lee
*Director of the United States Patent and Trademark Office*